June 21, 1966    D. E. GOULD ET AL    3,257,303
TREATING OF PLASTIC COATED FOILS
Filed March 12, 1962
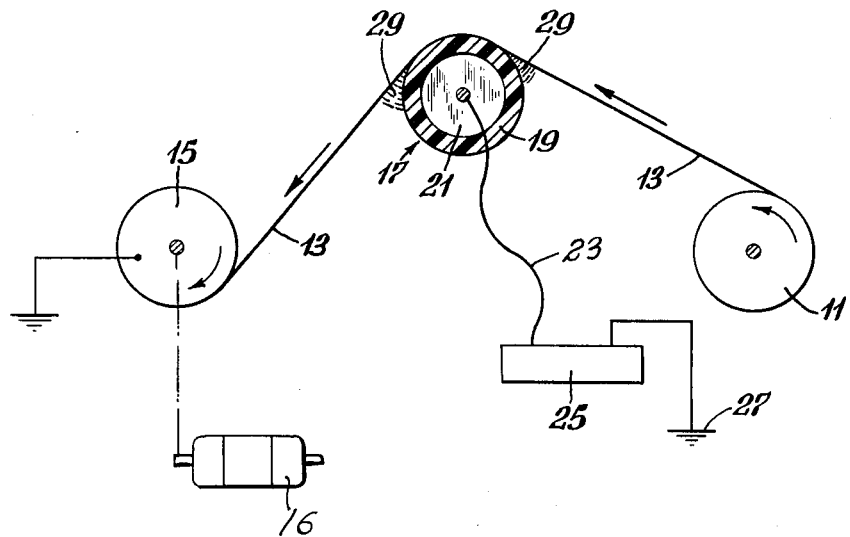
INVENTORS
DONALD E. GOULD
LOUIS A. PRELI, JR.
BY Maurice W. Ryan
ATTORNEY

United States Patent Office 3,257,303
Patented June 21, 1966

3,257,303
TREATING OF PLASTIC COATED FOILS
Donald E. Gould and Louis A. Preli, Jr., Somerset County, N.J., assignors to Union Carbide Corporation, a corporation of New York
Filed Mar. 12, 1962, Ser. No. 178,925
8 Claims. (Cl. 204—168)

The present invention relates to the treating of plastic film materials and more particularly to a method and apparatus for improving the exposed surface adhesion qualities of films of plastic such as polyethylene which have been applied to electrically conductive substrates such as metal foils.

The use of plastic films in sheet or film form as packaging materials is now well known and has wide application. Improvements in laminating, bonding and coating techniques have provided means and methods whereby such films may be combined with metal foil wrapping materials to produce tough insulative, decorative, and barrier wrappings having, in many applications, more advantageous features than plastic film alone. Most plastic film surfaces, however, are not ideally suited to the application thereon of other materials such as paints or inks. Polyethylene, for example, because of its paraffin-like surface properties, cannot be satisfactorily imprinted without some sort of treatment to render its surface more receptive and lastingly adhesive to printing ink. When, for example, untreated polyethylene film is imprinted with any of the known types of inks, the dried imprints do not adhere firmly to the polyethylene surface and can be removed with very little effort by slight abrasion or even fingernail scraping. This characteristic poor receptivity to printing inks, were it not for available treating methods, would, of course, present a serious disadvantage for plastic materials as wrappings whereon it is desired to imprint various indicia such as trademarks, recipes, advertising and the like and would seriously limit their application.

Several methods and devices are available in the art for the treatment of plastic films to increase the plastic surface receptivity to inks and the like. See for example United States Patent No. 2,810,933, issued to R. F. Pierce et al. on October 29, 1957. In general, the known methods of plastic treatment to produce this effect, comprehend subjecting the film to an electrical discharge established between two electrodes. The film is passed continuously through a relatively high voltage stress zone or a corona aura. Exposure of the plastic film to high voltage electrical stress has no apparent effect on the strength, transparency, chemical inertness or other desirable characteristics of the film. While the precise mechanism of what occurs in or on the film is not fully understood, it has been found that films so treated become exceptionally receptive to imprinting or further coating and that such imprints and coatings adhere very tenaciously to the film surface.

While such methods and apparatus for improving surface adhesiveness are effective in treating plastic materials alone, the known electrical stress or corona discharge techniques have not been found ideally suitable for treating plastic film coated substrates of electrically conductive material such as for example polyethylene coated aluminum foil. The conventional treatment methods have been found frequently to cause pinholes through the material, thought to be occasioned by electrical short circuits through the conducting components of the film.

Accordingly, it is a principal object of the present invention to provide a method and apparatus for treating plastic film coated electrically conductive substrates to render the plastic film surfaces thereof more receptive and retentive to imprinting or further coating thereon.

More specifically, it an object of the present invention to provide a method and apparatus for treating polyethylene coated electrically conductive substrates such as metallic foils to improve surface adhesion to further coating and to imprinting.

It is a further object of the present invention to provide such a method and apparatus which comprehends efficient use of electrical energy required in the adhesive-improving treatment of plastic film coated electrically conductive substrates.

With the foregoing and other features in view, which shall hereinafter be described more fully, the present invention may now be described with greater particularity and with reference to the drawing which is a schematic-diagrammatic presentation of an embodiment of apparatus according to our invention and which, taken in conjunction with the ensuing description, will also illustrate the method of our invention.

In the drawing there is shown at the right a cylindrical feeding roller 11, adapted to hold a supply of plastic coated electrically conductive film 13 which unwinds or feeds off from roller 11 in the direction indicated by the arrow symbol shown parallel to the film, the roller 11 rotating counterclockwise as the film moves. Film 13 passes over a treating roller, indicated generally at 17, and is disposed to effect contact with the outer surface of the treating roller 17 on an arcuate portion of the roller 17 periphery. After passing over treating roller 17, the film 13 is wound onto a takeup roller 15, shown at the left of the drawing. Takeup roller 15 rotates clockwise as shown and may be adapted, through mechanical connection to any suitable driving means such as an electric motor 16, to furnish the winding motive power required to pull the film 13 over the treating roller 17 from the feeding roller 11 at a tension sufficient to cause treating roller 17 to rotate (counterclockwise). The film is arranged so that the plastic coating thereon is the surface which comes into contact with the treating roller 17. Here it should be noted that the several rollers are arranged in space to provide for establishing an arcuate contact interface between the film surface and a portion of the outer peripheral surface of the treating rollers. In the arrangement shown the rotational or cylindrical axis of the treating roller 17 is offset vertically upward from the respective elevations of the similar axes of the feeding and takeup rollers. The arrangement could be inverted or otherwise disposed in space, the only requirement being that an arcuate contact of the film on the treating roller is assured by locating the cylindrical axis of the treating roller to be noncoplanar with respect to a common plane extending between the respective axes of the feeding and takeup rollers. In such an arrangement, generally wedge-shaped air gaps 29 will be formed between the film plastic face and the treating roller 17 surface.

Treating roller 17 comprises an electrically nonconductive outer annulus 19 which is concentrically arranged on an electrically conductive cylindrical core 21. The electrically conductive core is connected by a circuit 23 to one terminal of a two terminal electrical potential source 25. The other terminal of the source 25 is connected to ground as at 27.

In operation, the takeup roller 15 is driven to pull the film 13 across the treating roller 17 with sufficient tension to rotate the treating roller and, simultaneously, the electrical potential source 25 is adjusted to provide an output voltage charge sufficient to produce electrical corona discharge in the wedge-shaped air gaps 29 immediately adjacent the peripheral contact interface between the plastic face or coating of the film 13 and the nonconductive annulus 19 which defines the outer peripheral surface of treating roller 17. The plastic surface of the film thus continuously is brought into contact with a partial periphery of the treating roller 17. The corona produced in the air gaps 29 obtains between the treating roller core and an electrode-like equipotential plane provided by the electrically conductive substrate of the film 13.

The treating roller 17 must be completely insulated from ground. This may be accomplished by providing insulated mounting means between bearing journals for the treating roller and whatever bedplate or frame it rests upon. The takeup roller 15 may be grounded to insure against possible build-up of static electric charge.

In a particular apparatus embodiment according to our invention, a 36 inch long 2 inch diameter stainless steel cylinder was selected as a treating roller core 21. On this core 20 layers of a 2 mil thick high tensile strength polyethylene terephthalate resin film was tightly wrapped to exclude air and secured with adhesive tape to form a treating roller outer annulus 19. The thus constituted treating roller 17 was supported in metal journals or pillow blocks which were encased in a phenolic laminate insulating material attached in turn to a frame of a standard extrusion coating machine between a chill roll and a takeup roll thereon mounted. A commercially available spark generator, rated for maximum input of 1.5 kw. at 115 volts, 60 cycle, single phase, unity power factor, was used as the electrical potential source 25. One terminal of the spark generator and the extrusion coating machine frame were connected to a common ground and the other output terminal of the spark generator was connected electrically by a conductor circuit 23 to the core 21 of the treating roller.

With this arrangement, a 14⅛ inch wide roll of material comprising 3000 feet of a ¾ mil polyethylene coated 15 point bleachboard laminated to .00035 inch aluminum foil with a vinyl adhesive was threaded through the extrusion coating machine, across the top periphery of the treating roller and onto the takeup roller. Tension was adjusted to rotate the treating roller as the film material passed thereover at a constant drive rate of about 50 feet per minute. The spark generator unit was operated at a 100 watt input and an output amperage of 0.55. After completely treating the roll with the apparatus arrangement according to the method of our invention, the polyethylene surface of the material was found to have no pinholes or other defects and excellent ink adhesion was obtained in imprinting tests. Three additional rolls of the same type of laminate were similarly treated, all the treated material aggregating to a total of about 2000 pounds. No defects occurred in any of the three treated materials and the ink adhesion and receptivity characteristics of the polyethylene were uniformly excellent.

When conventional treating methods involving two spaced treating electrodes and passage of the material between them were employed on similar material, burned-through points and erratic surface adhesion improvement occurred at low power levels. Higher power levels produced burned holes through the material. It appeared that arcs struck through the polyethylene and burned right through the aluminum foil.

While, in the foregoing description, certain specific details and operative steps have been set forth, variations may be made in these without departing from the spirit of the present invention. The selection and application of numerous equivalents, which, combined, will comprise apparatus according to our invention and whereby the method of our invention may be practiced, will undoubtedly be suggested by our description to persons skilled in the art. The foregoing description therefore has been given for clearness of understanding only, and no unnecessary limitations should be understood therefrom.

What is claimed is:

1. A method of treating of plastic material coated electrically conductive substrate to render the plastic material surface thereof more retentive to further coatings, which method comprises continuously directing a plastic material surface of said plastic material coated substrate into peripheral contact with a peripheral surface of a rotating nonconductive roller having a conductive core and simultaneously developing an electrical charge through the nonconductive roller and the plastic material coating between said conductive core and the conductive substrate, said charge being of sufficient intensity to produce corona in air gaps immediately adjacent the peripheral contact interface between the plastic material surface of the plastic material coated substrate and the peripheral surface of the nonconductive roller.

2. A method according to claim 1 wherein the electrical charge developed is an alternating current charge.

3. A method of treating a plastic material coated electrically conductive substrate to increase the adhesion characteristics of the plastic material surface thereof, which method comprises continuously passing a plastic material surface of said plastic material coated substrate over a rotating nonconductive roller having an electrically conductive core and simultaneously applying an electrical charge to said conductive core of sufficient intensity to produce corona in air gaps immediately adjacent a peripheral contact interface formed between the plastic material surface of the plastic material coated substrate and peripheral surface of the nonconductive roller.

4. A method according to claim 3 wherein the electrical charge applied is an alternating current charge.

5. A method of treating a polyethylene coated electrically conductive substrate to render the polyethylene surface thereof more retentive to further coatings, which method comprises continuously directing a polyethylene surface of said polyethylene coated substrate into momentary partial peripheral contact with a peripheral surface of a rotating nonconductive roller having a conductive core and simultaneously developing an electrical charge through the nonconductive roller and the polyethylene coating between said conductive core and the conductive substrate, said charge being of sufficient intensity to produce corona in air gaps immediately adjacent the peripheral contact interface between the polyethylene surface of the polyethylene coated substrate and the peripheral surface of the nonconductive roller.

6. A method according to claim 1 wherein the electrical charge developed is an alternating current charge.

7. A method of treating a polyethylene coated electrically conductive substrate to increase the adhesion characteristics of the polyethylene surface thereof, which method comprises continuously passing a polyethylene surface of said polyethylene coated substrate over a rotating nonconductive roller having an electrically conductive core and simultaneously applying an electrical charge to said conductive core of sufficient intensity to produce corona in air gaps immediately adjacent a peripheral contact interface formed between the polyethylene surface of the polyethylene coated substrate and peripheral surface of the nonconductive roller.

8. A method according to claim 3 wherein the electrical charge applied is an alternating current charge.

References Cited by the Examiner

UNITED STATES PATENTS

| | | | |
|---|---|---|---|
| 2,864,755 | 12/1958 | Rothacker | 204—165 |
| 3,018,189 | 1/1962 | Traver | 204—168 |

JOHN H. MACK, *Primary Examiner.*

JOHN R. SPECK, *Examiner.*

WINSTON A. DOUGLAS, H. S. WILLIAMS,
*Assistant Examiners.*